(12) United States Patent
Deshpande

(10) Patent No.: US 6,775,539 B2
(45) Date of Patent: Aug. 10, 2004

(54) INTELLIGENT, NON-INTRUSIVE, ADAPTIVE WIRELESS DISCOUNT COUPON DELIVERY SYSTEM OVER GPRS

(75) Inventor: Nikhil M. Deshpande, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 471 days.

(21) Appl. No.: 09/967,693

(22) Filed: Sep. 28, 2001

(65) Prior Publication Data

US 2003/0064713 A1 Apr. 3, 2003

(51) Int. Cl.[7] .............................................. H04B 1/06
(52) U.S. Cl. ................................. 455/414.4; 455/466
(58) Field of Search ........................ 455/414.1, 414.3, 455/414.4, 466

(56) References Cited

U.S. PATENT DOCUMENTS

2001/0034651 A1 * 10/2001 Marks et al. ................. 705/14
2002/0004746 A1 * 1/2002 Ferber et al. ................. 705/14
2002/0042774 A1 * 4/2002 Orfiz et al. ................... 705/39
2002/0095333 A1 * 7/2002 Jokinen et al. ............... 705/14
2002/0151294 A1 * 10/2002 Kirby et al. ................. 455/406
2003/0126250 A1 * 7/2003 Jhanji ......................... 709/223

* cited by examiner

Primary Examiner—Creighton Smith
(74) Attorney, Agent, or Firm—Pillsbury Winthrop LLP

(57) ABSTRACT

An intelligent, non-intrusive, adaptive wireless discount coupon delivery system over General Packet Radio Service ("GPRS") bearer service. The system generates and delivers electronic coupons to subscribers' GPRS mobile stations from business entities in the subscribers' vicinity. The system bases its delivery on the subscribers' profiles stored in their mobile phones, which may include their cellular location and their shopping histories. The main components of the system include: a GPRS mobile station, a base station, a mobile-switching center ("MSC"), a serving GPRS service node ("SGSN"), a coupon generating server ("CGS"), an offer generating server ("OGS"), and store pricing databases. The system increases the facility and trustworthiness of wireless coupon delivery by isolating subscriber profile information from stores' pricing databases.

30 Claims, 2 Drawing Sheets

INTELLIGENT, NON-INTRUSIVE, ADAPTIVE WIRELESS DISCOUNT COUPON DELIVERY SYSTEM OVER GPRS

BACKGROUND

1. Field of the Invention

Embodiments described herein are directed to an intelligent, non-intrusive, adaptive wireless discount coupon delivery system over the General Packet Radio Service ("GPRS"). Specifically, the system generates and delivers electronic coupons to GPRS subscribers from business entities in the subscribers' vicinity.

2. Related Art

GPRS is a nonvoice value added service that allows information to be sent and received across a mobile telephone network. See Global System for Mobile Communication ("GSM") 09.60:—"Digital Cellular Telecommunications System (Phase 2+); General Packet Radio Service ("GPRS"); GPRS Tunneling Protocol ("GTP") Across the Gn and Gp Interface", European Telecommunications Standard Institute ("ETSI") EN 301 347 V7.5.1, released 1998). In essence, GPRS involves overlaying a packet-based air interface on an existing circuit switched network. This scheme gives a user an option to use a packet-based data service. Packet switching means that GPRS radio resources are used only when users are actually sending or receiving data. Theoretical maximum speeds of up to 171.2 kilobits per second are achievable with GPRS using all eight of its timeslots concurrently. GPRS facilitates instant connections whereby information may be sent or received immediately as the need arises, subject to radio coverage. No dial-up modem connection is necessary. High immediacy is an important feature of GPRS for time critical applications, such as remote credit card authorization. To use GPRS, users need the following: a mobile phone or terminal that supports GPRS; a subscription to a mobile telephone network that supports GPRS; knowledge of how to send and/or receive GPRS information using their specific model of mobile phone, including software and hardware configurations; and a destination in which to send or receive information through GPRS.

While wireless coupon delivery mechanisms over GPRS and other wireless technologies exist, current systems are not personalized. That is, they do not isolate subscribers' profile information from store databases. Accordingly, such delivery services cannot ensure privacy. In addition, most of the coupons today are generalized and thus not traceable. In current systems, no "preferred customer cards" are established. It is thus difficult for a pricing system to understand that a subscriber has preferred status, even if the subscriber has used coupons many times in the past.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

Figure 1:
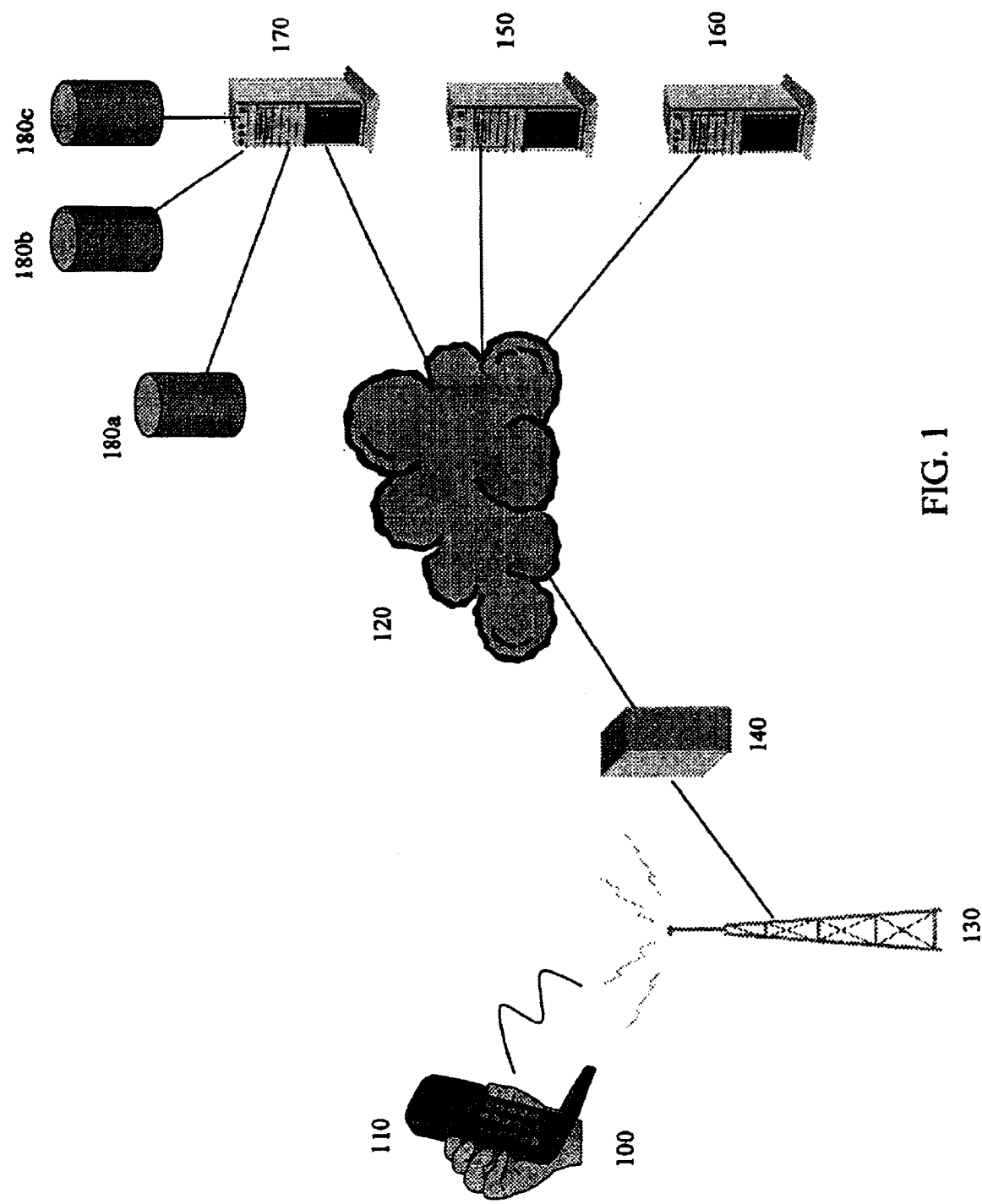
FIG. 1 illustrates a wireless discount coupon delivery system over General Packet Radio Service ("GPRS") according to an embodiment of the present invention.
Figure 2:
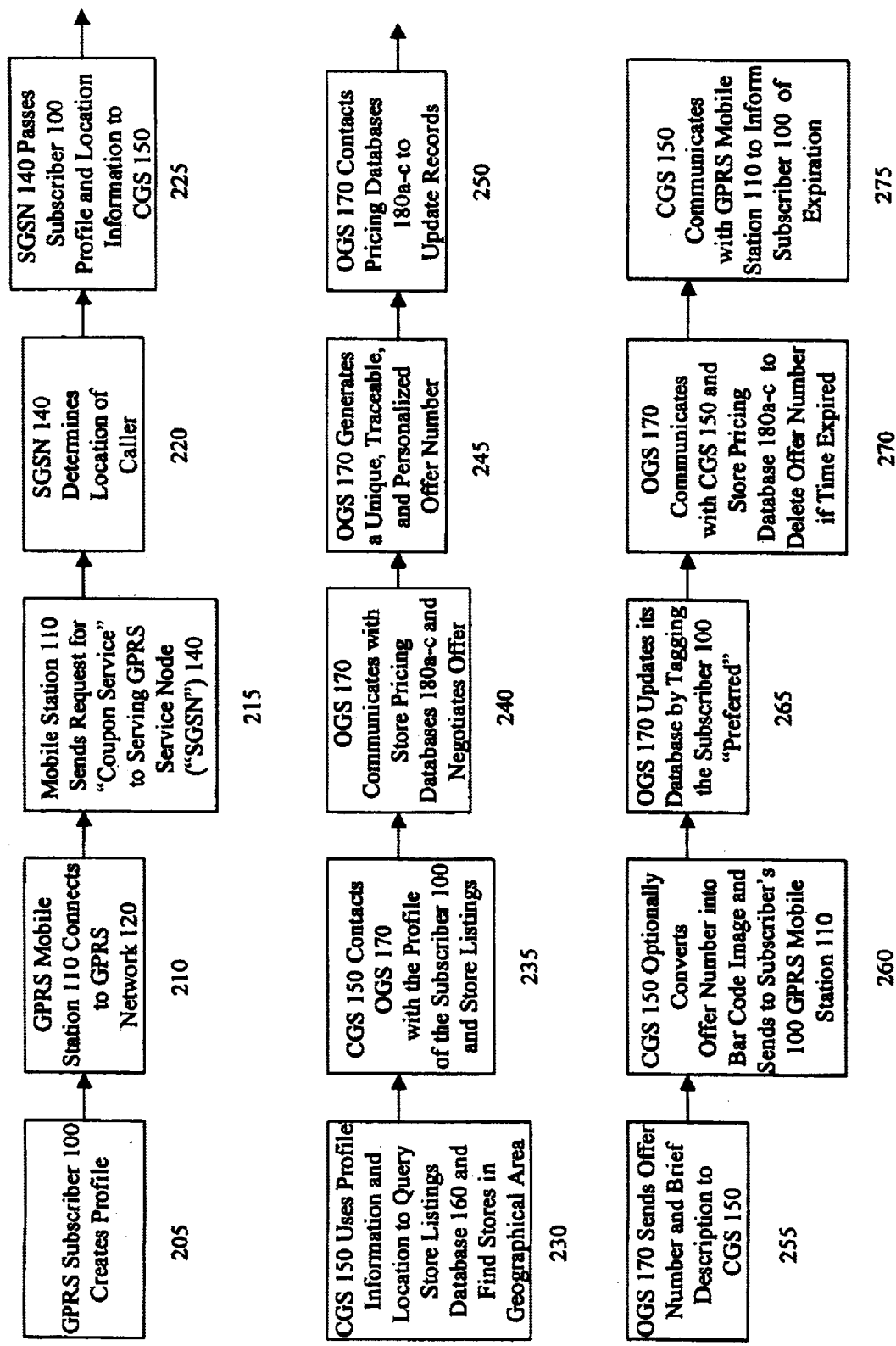
FIG. 2 illustrates a flowchart depicting steps involved in achieving wireless discount coupon delivery over GPRS according to an embodiment of the present invention.

The following paragraphs describe an intelligent, non-intrusive, adaptive wireless discount coupon delivery system over General Packet Radio Service ("GPRS") or any other present or future wireless technology. FIG. 1 illustrates one embodiment of the present invention, whereby the components of the invention are depicted. In addition, FIG. 2 depicts steps involved in achieving wireless discount coupon delivery over GPRS. Referring to FIGS. 1 and 2, the GPRS mobile station 110 stores information about a subscriber 100 as his/her created profile. This step is depicted as step 205. The profile may include, for example, name, telephone number, business entities of interest, genre of shopping interest, credit card number, preferred customer number, and the like. The GPRS station 110 allows the subscriber 100 to make only part of his/her profile visible to a third party. That is, the subscriber 100 may choose to make his name and telephone number visible, while maintaining private the remaining profile attributes. As such, a profile is divided into two sections—public and private. The information stored in the public section is made visible to anyone. In sharp contrast, the information stored in the private profile is not visible to anyone. The subscriber 100 may choose, however, to make the information available on a per instance basis. To this extent, a small client program runs on the GPRS mobile station 110 to enable the subscriber 100 to send a "coupon service request." When this request is transmitted, it shall be understood that the subscriber 100 has opted for sharing his/her profile information, public and if applicable, private, with the coupon generating server 150.

As shown in step 210, the GPRS mobile station 110 connects to the GPRS network 120. This step is achieved by a command such as "GPRS_ATTACH". Meanwhile, the base station 130 is a typical GPRS base station subsystem that may contain a radio tower, an amplifier, and an antenna. Each base station 130 has a BASE_STATION_ID. For each call processed, the base station 130 passes the BASE_STATION_ID to the Serving GPRS Service Node ("SGSN") 140.

The base station 130 then connects to the Mobile-Switching Center ("MSC") and SGSN 140. The SGSN 140 contains a database with the BASE_STATION_ID and CELL_LOCATION. The SGSN 140, thus, determines the approximate location of the GPRS mobile station 110 based on the BASE_STATION_ID through which it is communicating. This action is shown as step 220. As shown in step 215, if a "coupon service request" is received by the SGSN 140, then the SGSN 140 forwards the request along with the subscriber 100 profile and CELL_LOCATION to the Coupon Generating Server ("CGS") 150 over the GPRS network 120, which may be the Internet or a managed IP network. Step 225 outlines the above-described action.

The CGS 150 compares the CELL_LOCATION with a "Store Listings Database" 160 and filters the listings of stores that are within the same geographical area as the CELL_LOCATION. That is, the CGS 150 begins with a radius of 100 meters to search for store listings. It then gradually expands its search to a five-mile radius. If no results are returned after the search, it will continue to expand its search, via an appropriate algorithm, until at least several store listings are found. The CGS 150 uses all the available information about the subscriber 100 from the SGSN 140. For instance, if a profile sent by the SGSN 140 merely lists the name and telephone number, the CGS 150 will search for all the stores in the desired geographical area. If, however, the profile sent by the SGSN 140 includes the subscriber's 100 "stores of interest", the CGS 150 will search for only those stores. If the profile further includes that which the subscriber 100 specifically desires, i.e., grocery store, electronics store, clothing store, etc., then the CGS 150 will further refine its search. In general, the function of the CGS 150 is to extract the listings of the stores that best match the subscriber's 100 profile. This step is illustrated in step 230.

As shown in step 235, once the CGS 150 identifies the store listings within the desired geographical area, the CGS 150 contacts the Offer Generating Server ("OGS") 170 to determine if there are any "coupons" which stores may be offering. The CGS 150 conveys to the OGS 170 all the relevant information it has about the subscriber 100 profile that the subscriber 100 has agreed to make public. The CGS 150 further provides to the OGS 170 the IP address of the store pricing database 180*a–c*.

As illustrated by step 240, the OGS 170 may then search the subscriber's 100 name, telephone number, and other available details to determine what discounts it can offer to the subscriber 100 by contacting the various store pricing databases 180*a–c*. The OGS 170 does not share any subscriber 100 profile information with the store pricing databases 180*a–c*, unless specifically requested by the subscriber 100. Once the OGS 170 and the store pricing database 180*a–c* mutually agree upon an offer, the OGS 170 generates an offer number and a brief description of the offer and sends them to the CGS 150. This arrangement is described in steps 245 and 255. The OGS 170 further updates the store pricing database 180*a–c*, as shown in step 250. The OGS 170 uses a specialized algorithm for generating the unique, personalized offer number that uses the subscriber's 100 telephone number, time of day, store location, and the like.

The OGS 170 sends the offer number or offer numbers for multiple stores to the CGS 150, which then forwards it to the SGSN 140 and then delivers it to the subscriber's 100 GPRS mobile station 110. The CGS 150 may optionally convert the number into a bar code image that can further be sent to the GPRS mobile station 110, as shown in step 260. The GPRS mobile station 110 will then store the information.

The OGS 170 communicates with individual store pricing databases 180*a–c* over the GPRS network 120, which may be a managed IP or private network. Pricing information is always stored at the pricing database 180*a–c* and not on the OGS 170. The function of the OGS 170 is to negotiate the offer with pricing databases 180*a–c* of each store, generate a unique and traceable offer number for the subscriber 100 and then update the store pricing databases 180*a–c* with the number. The offer could be time-sensitive and could expire automatically. Upon the expiration of the offer, the OGS 170 removes the entry from the store pricing database 180*a–c* and further contacts the CGS 150 informing it of the expiration. This step is illustrated in step 270. As shown in step 275, when such request is received by the CGS 150, the CGS 150 connects to the subscriber 100 GPRS mobile station 110 and informs the subscriber 100 of the expiration. The CGS 150 can delete the offer numbers or bar code images with or without subscriber 100 intervention.

When the subscriber 100 decides to redeem the offer, the subscriber 100 simply walks into the store and presents the bar code or offer number. The store pricing database 180*a–c* compares the offer number with the stored number and honors the previously agreed discount upon purchase. Upon redemption, the OGS 170 receives confirmation from the store pricing database 180*a–c* and the OGS 170 then updates and maintains the subscriber 100 record. As illustrated in step 265, the OGS 170 may optionally tag a store name as "preferred" for the subscriber 100 and use this information when the subscriber 100 requests coupon service at a later date. From the providers of mobile services perspectives, this wireless coupon delivery service over GPRS should prove to be a revenue-generating opportunity.

Indeed, there is a need for an easy wireless coupon delivery service that maintains subscriber privacy. For example, the CGS 150 and the OGS 170 act as brokers on behalf of the subscriber 100. The CGS 150 and OGS 170 will not communicate personal information about the subscriber 100 to the pricing database of stores 180*a–c*. Instead, the CGS 150 uses location information to find stores within a desired geographical area. Meanwhile, the OGS 170 acts as a conduit for negotiating an offer. The OGS 170 can extract pertinent subscriber 100 information and provide only the necessary information about the subscriber 100 to the pricing database 180*a–c*. The OGS 170 obtains the offer and generates a unique offer number that is personalized for the subscriber 100. The concept of unique offer number generation provides an advantage over current systems, as stores can track offers, and subscribers 100 are ensured privacy. This is possible because when an offer is redeemed, only the CGS 150/OGS 170 can decode the offer number into the subscriber 100 user profile and information.

While the above description refers to particular embodiments of the present invention, it will be understood to those of ordinary skill in the art that modifications may be made without departing from the spirit thereof The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A wireless coupon delivery system over wireless technology, comprising:
   a mobile station terminal connected to a wireless network;
   a base station having a base station identification and connected to a mobile switching center and service node;
   a mobile switching center and a service node, connected to the wireless network, wherein the service node has a database that contains base station identifications and cell locations to determine a location of a subscriber;
   a coupon generating server ("CGS"), connected to the wireless network, that uses location information to find stores in a desired geographic area;
   an offer generating server ("OGS"), connected to the wireless network and to at least one of a store pricings database, that negotiates offers and generates personalized and traceable offer numbers;
   a store listings database, connected to the wireless network, that comprises a list of business entities; and
   at least one of a store pricings database connected to the OGS.

2. The system of claim 1, wherein the wireless technology is a General Packet Radio Service ("GPRS").

3. The system of claim 1, wherein the mobile station terminal stores information about a subscriber in a profile.

4. The system of claim 3, wherein the profile contains information of at least one of a name, a telephone number, stores of interest, a credit card number, and a preferred customer number.

5. The system of claim 1, wherein the wireless network is a public data communication network including at least one of an Internet and an Intranet.

6. The system of claim 1, wherein the mobile station sends a request for "coupon service" to the service node.

7. The system of claim 1, wherein the service node transmits a subscriber profile and location information to the CGS.

8. The system of claim 7, wherein the CGS uses the profile and location information to query store listings and find stores in a desired geographic location.

9. The system of claim 7, wherein the CGS contacts the OGS with the subscriber profile information and store listings.

10. The system of claim 1, wherein the OGS communicates with the store pricing database to negotiate an offer.

11. The system of claim 1, wherein the CGS and OGS maintain subscriber privacy.

12. The system of claim 1, wherein the OGS generates personalized and traceable offer numbers based on subscriber profile information and transmits the offer numbers to the CGS.

13. The system of claim 12, wherein the CGS converts an offer number into a bar code image and sends it to a subscriber's mobile station.

14. The system of claim 1, wherein the OGS communicates with the CGS and store pricing database to delete an offer number if time has expired.

15. The system of claim 14, wherein the CGS communicates with the mobile station to inform the subscriber of expiration of the offer.

16. A method of delivering wireless discount coupons over wireless technology comprising:
   creating and storing a subscriber profile in a mobile station terminal;
   connecting the mobile station to a wireless network;
   sending a request for "coupon service" to a service node;
   determining a location of a subscriber;
   transmitting the subscriber profile and the location information to a coupon generating server;
   using the subscriber profile and the location information to query a store listings database and locate stores in a desired geographical area;
   negotiating an offer between an offer generating server and store pricing databases;
   generating a unique, personalized, and traceable offer number;
   contacting the store pricing databases to update records;
   sending the offer number and a description to the coupon generating server;
   updating the offer generating server database and communicating with the coupon generating server and the store pricing databases to delete the offer number if time has expired.

17. The method of claim 17, wherein the wireless technology is a General Packet Radio Service ("GPRS").

18. The method of claim 17, wherein the coupon generating server compares a cell location with a store listings database to locate stores within the desired geographical area.

19. The method of claim 18, wherein the coupon generating server uses a gradual expansion algorithm to locate the stores in the desired geographical area.

20. The method of claim 16, wherein the offer generating server uses an algorithm for generating the offer number that uses the subscriber's profile information.

21. The method of claim 16, wherein the coupon generating server converts an offer number into a bar code image and sends it to a subscriber's mobile station.

22. The method of claim 16, wherein the coupon generating server and the offer generating server maintain subscriber privacy.

23. The method of claim 16, wherein the subscriber profile has a public section and a private section and contains information of at least one of a name, a telephone number, stores of interest, a credit card number, and a preferred customer number.

24. A wireless coupon delivery system comprising a readable medium and a computer-readable program code stored on the computer readable medium having instructions to:
   create and store a subscriber profile;
   determine a subscriber location;
   query store listings and extract listings of stores that best match the subscriber profile; negotiate an offer;
   generate an offer number based on the subscriber profile;
   update pricing records; and
   convert the offer number into a bar code image; and
   compare the offer number with a stored number.

25. The system of claim 24, wherein the subscriber profile has a public section and a private section and contains information of at least one of a name, a telephone number, stores of interest, a credit card number, and a preferred customer number.

26. The system of claim 24, wherein the subscriber location is determined by a base station identification and a cell location.

27. The system of claim 24, wherein a coupon generating server and an offer generating server act as brokers on behalf of a subscriber and do not communicate personal information about the subscriber.

28. The system of claim 24, wherein an offer generating server updates its records by tagging a subscriber "preferred."

29. The system of claim 24, wherein an offer generating server communicates with a coupon generating server and a store pricing database to delete the offer number upon expiration of time, and the coupon generating server communicates with a mobile station to inform a subscriber of expiration.

30. The system of claim 29, wherein communication occurs over a wireless data communication network.

* * * * *